(12) United States Patent
Wilt et al.

(10) Patent No.: US 10,379,250 B2
(45) Date of Patent: Aug. 13, 2019

(54) ELECTROMAGNETIC DATA ACQUISITION SYSTEM FOR REMOVING NEAR SURFACE EFFECTS FROM BOREHOLE TO SURFACE ELECTROMAGNETIC DATA

(71) Applicant: GroundMetrics, Inc., San Diego, CA (US)

(72) Inventors: Michael Wilt, Walnut Creek, CA (US); Karl N Kappler, Victoria (CA)

(73) Assignee: GroundMetrics, Inc., San Diego, CA (US)

( * ) Notice: Subject to any disclaimer, the term of this patent is extended or adjusted under 35 U.S.C. 154(b) by 0 days.

(21) Appl. No.: 15/572,547

(22) PCT Filed: May 11, 2016

(86) PCT No.: PCT/US2016/031749
§ 371 (c)(1),
(2) Date: Nov. 8, 2017

(87) PCT Pub. No.: WO2016/183138
PCT Pub. Date: Nov. 17, 2016

(65) Prior Publication Data
US 2018/0136359 A1     May 17, 2018

Related U.S. Application Data

(60) Provisional application No. 62/159,656, filed on May 11, 2015.

(51) Int. Cl.
| G01V 3/00 | (2006.01) |
| G01V 3/38 | (2006.01) |
| G01V 3/08 | (2006.01) |
| G01V 3/30 | (2006.01) |

(Continued)

(52) U.S. Cl.
CPC .................. *G01V 3/38* (2013.01); *G01V 3/08* (2013.01); *G01V 3/26* (2013.01); *G01V 3/30* (2013.01); *G01V 3/34* (2013.01)

(58) Field of Classification Search
CPC ... G01V 3/26; G01V 3/34; G01V 3/38; G01V 3/08; G01V 3/30
See application file for complete search history.

(56) References Cited

U.S. PATENT DOCUMENTS

| 7,333,893 B2 | 2/2008 | Burtz et al. |
| 7,573,780 B2 * | 8/2009 | Thompson ............. G01V 3/082 324/359 |

(Continued)

OTHER PUBLICATIONS

Asch et al. "Mapping and monitoring electrical resistivity with surface and subsurface electrode arrays." Geophysics 54, No. 2 (1989): 235-244.

(Continued)

*Primary Examiner* — Minh N Tang
(74) *Attorney, Agent, or Firm* — Diederiks & Whitelaw, PLC.

(57) ABSTRACT

An electromagnetic data acquisition system and an associated method for measuring subsurface structures with electromagnetic fields is employed for removing near surface effects from borehole to surface electromagnetic data. Preferably, the system is used to obtain information about deep, target structures located deep below the Earth, especially in oil and gas fields, while mitigating the effect of near surface geological shallow structures on collected electromagnetic (EM) data by using a series of electromagnetic measurements and data treatments that preferentially illuminate near surface geologic shallow structures so that the shallow structures may be recovered separately from deep structures of interest.

16 Claims, 3 Drawing Sheets

(51) Int. Cl.
*G01V 3/26* (2006.01)
*G01V 3/34* (2006.01)

(56) References Cited

U.S. PATENT DOCUMENTS

| | | |
|---|---|---|
| 7,582,087 B2 | 9/2009 | Tetzlaff et al. |
| 8,188,749 B2 | 5/2012 | Wilt et al. |
| 9,611,736 B2 | 4/2017 | Marsala et al. |
| 2006/0217889 A1* | 9/2006 | Burtz ............... G01V 3/083 702/7 |
| 2011/0050232 A1* | 3/2011 | Wilt ................ G01V 3/30 324/334 |
| 2015/0061684 A1* | 3/2015 | Marsala ............ E21B 49/00 324/355 |
| 2015/0160364 A1 | 6/2015 | Hibbs et al. |
| 2015/0219784 A1 | 8/2015 | Hibbs et al. |

OTHER PUBLICATIONS

Colombo et al. "Sensitivity analysis of 3D surface-borehole CSEM for a Saudi Arabian carbonate reservoir." In *SEG Technical Program Expanded Abstracts* 2012, pp. 1-5. Society of Exploration Geophysicists, 2012.

Dyck, Alfred V. "Drill-hole electromagnetic methods." In Electromagnetic Methods in Applied Geophysics: vol. 2, Application, Parts A and B, pp. 881-930. Society of Exploration Geophysicists, 1991.

Tseng et al. "A borehole-to-surface electromagnetic survey." *Geophysics* 63, No. 5 (1998): 1565-1572.

Wilt et al. *Monitoring of subsurface contaminants with borehole/surface resistivity measurements*. No. LBL-19106; CONF-850275-1. Lawrence Berkeley Lab., CA (USA), 1985.

* cited by examiner

ELECTROMAGNETIC DATA ACQUISITION SYSTEM FOR REMOVING NEAR SURFACE EFFECTS FROM BOREHOLE TO SURFACE ELECTROMAGNETIC DATA

CROSS-REFERENCE TO RELATED APPLICATIONS

The present application represents a National Stage application of PCT/US2016/031749 entitled "Electromagnetic Data Acquisition System for Removing Near Surface Effects from Borehole to Surface Electromagnetic Data", filed May 11, 2016, which claims the benefit of U.S. Provisional Application Ser. No. 62/159,656 entitled "Removal of Near Surface Effects from Borehole to Surface Electromagnetic (EM) Data" filed May 11, 2015. The entire contents of these applications are incorporated herein by reference.

BACKGROUND OF THE INVENTION

The present invention pertains to the art of electromagnetic geophysical surveys conducted near a borehole and, more specifically, to mitigating the effect of near surface geological structures on electromagnetic data collected during the surveys. The embodiments described herein relate generally to soundings within the Earth based upon electrical or magnetic fields. As used herein, "Earth" generally refers to any region in which a borehole may be located including, for example, the lithosphere. Electromagnetic geophysical surveys probe electrical resistivity, or equivalently, conductivity, in the ground as a function of depth. While the term "electromagnetic" is used generally, the term is intended to cover electric and/or magnetic or even induced polarization techniques.

The source of the electromagnetic field used in a geophysical survey may originate in the natural environment or be manmade. Generally known methods employ transmitters that induce electrical currents to flow in the ground. The transmitters are preferably sources of electric current injected by electrodes implanted in the soil or rock and connected to a power supply or the transmitters are loops of wire carrying an alternating current which produces an alternating magnetic field that, by Faraday's law of induction, induces an electromotive force in the ground that, in turn, drives currents in the ground. In either case, the currents induced depend on the distribution of resistivity in the ground and these induced currents produce secondary electric and magnetic fields that are measured by receivers which are usually separated from the transmitter. For instance, the receivers may include two separated electrodes in contact with the ground and across which a voltage is measured that is proportional to the electric field at that point. Receivers may also include a variety of sensors designed to measure the magnetic fields that accompany the induced currents. The transmitters and receivers can be on the surface or in the ground.

These methods are used to determine the distribution of electrical resistivity in the ground. For example, the methods are preferably used to characterize the layering of the ground so as to identify an electrically resistive (high resistivity) layer that contains oil or gas, an electrically conductive (low resistivity) layer containing saline water, or a clay layer that might be an impermeable barrier for hot water in a geothermal setting, or other targets of contrasting electrical resistivity with the background. A more specific application of such methods is to determine the size and electrical resistivity of limited regions in the ground. Examples are zones of petroleum rich rock in an oilfield that has not been drained by the existing oil wells in the field (essentially bypassed oil), zones of electrically conducting rocks reflecting the presence of metallic ore minerals, a zone of enhanced electrical conductivity brought about by the injection under pressure of a fluid mixture designed to cause a fracture or a fluid mixed with solid conductive particles intended to keep the fracture open (proppant), or a zone of changing electrical resistivity caused by the injection of carbon dioxide for sequestration, or for mapping or monitoring carbon dioxide, steam or chemical for enhanced oil recovery (tertiary recovery) or water for improved oil recovery (secondary recovery) or mapping and monitoring steam or chemicals injected to reduce viscosity and increase production from an oilfield formation. The application need not be restricted to exploring oilfields; other applications include pollutant remediation and groundwater exploration. In all of these applications, the goal is to detect and, if possible, delineate a zone whose electrical resistivity is distinctly different from the resistivity of the overall volume of the ground below the surface in a specified region (referred to as the background resistivity). Since the resistivities of such targets and the surrounding medium may be quite dissimilar, it is possible to discriminate between them by measuring their subsurface resistivities when subjected to an electromagnetic field. Using this methodology, the depth, thickness, and lateral extent of materials of interest can be determined. Combined with other data, volumes and saturation can be determined as well.

Most of the prior work in this area concentrated on using a surface to borehole configuration rather than a borehole to surface configuration. The methods are similar, differing only in whether the transmitter is located in the borehole or at the surface. An advance in EM methods specifically for the deep subsurface is described in International Patent Application No. PCT/US2012/39010, entitled "System and Method to Measure or Generate an Electrical Field Downhole" now published as U.S. Patent Application Publication No. 2015/0160364, by Hibbs and Glezer, which is incorporated herein by reference. A further advancement described in International Patent Application No. PCT/US2013/058158, entitled "System and Method to Induce an Electromagnetic Field within the Earth", now published as U.S. Patent Application Publication No. 2015/0219784, by Hibbs and Morrison, which is also hereby incorporated by reference, is to remove the source electrode at depth within the casing and instead drive the entire casing of the borehole at the desired voltage, V, by making an electrical connection at or near the top of the casing.

Borehole to surface electromagnetics is emerging as a significant new method for imaging the Earth, especially in oil and gas fields and can produce accurate images of fluid distribution up to 2 km from a well. With this method, an electromagnetic (electric or magnetic) source is placed at depth, usually within a borehole, and when activated generates fields and currents within the subsurface that interact with subsurface structures. The total field is the sum of the provided signal (primary field) and that produced by this interaction (secondary field). The overall field is measured at the surface with an array of magnetic or electrical field detectors and the fields are inverted to yield an electrical resistivity distribution (or by inverse, conductivity distribution) that may be associated with targets of interest.

Borehole to surface electromagnetics is much more sensitive to subsurface structures than surface techniques due to the closer proximity of the source to the region of interest. That is, when the source is deployed close to the target region, the resulting field is much more sensitive to this body than a measurement with a more remote source. Unfortunately, although there is more sensitivity to structures near the transmitter antennas, there is also high sensitivity with structures near the receiver antennas, or the near surface geology, topography and infrastructure. That is, in areas of complex near surface or shallow geology, it may still be difficult to resolve deep targets from the influence due to "geologic noise", which is defined as small scale undefined near surface geologic structures.

With the above in mind, there is seen to be a need for a system and method for removing near surface effects from borehole to surface electromagnetic data.

SUMMARY OF THE INVENTION

The present invention is directed to an electromagnetic data acquisition system and an associated method for measuring subsurface structures with electromagnetic fields and for removing near surface effects from borehole to surface electromagnetic data. Preferably, the system is used to obtain information about targets located deep below the Earth's surface, especially in oil and gas fields, while mitigating the effects of near surface geological or shallow structures on collected electromagnetic (EM) data.

The system includes an electromagnetic source adapted to be operated at a depth in a borehole formed in the Earth's surface and for generating electromagnetic signals that interact with the subsurface structures and affect the electromagnetic fields. The system also includes an electromagnetic receiver adapted to be operated on the Earth's surface to detect the electromagnetic fields and produce data representative of the electromagnetic fields. A controller is connected to the source and receiver. The electromagnetic source is preferably an electric dipole source and, in use, the dipole source produces low frequency signals that affect the data associated with the shallow and deep structures and high frequency signals that affect the data associated with shallow structures. In another embodiment, the electromagnetic source produces a weak signal to generate data associated with near surface structures and a powerful signal to generate data associated with shallow and deep structures. In yet another preferred embodiment, the receiver is adapted to collect data associated with shallow structures from within a set distance of the borehole and is adapted to collected data associated with shallow and deep structures from distances greater than the set distance from the borehole. Alternatively, the electromagnetic source includes a transmitter at a shallow depth which produces signals that generate data associated with near surface structures and includes a transmitter at a deep depth which produces signals that generate data associated with shallow and deep structures. In a preferred embodiment, the borehole is in an oil and gas field and the target of interest is a hydrocarbon deposit, with the shallow geological formations and topography and man-made structures including pipelines, power lines, water pumps and other similar structures.

The data acquisition system is preferably employed with a method for removing near surface effects from borehole to surface electromagnetic data collected by an electromagnetic data acquisition system for measuring subsurface structures. The method includes deploying the system in an area of interest by placing an electromagnetic source down a borehole and placing an electromagnetic receiver on the surface. Then the source is activated to generate a first electromagnetic signal that primarily illuminates shallow structures and a second electromagnetic signal that illuminates both shallow and deep structures. Near surface, shallow measurement data produced by the first electromagnetic signal and combined shallow and deep measurement data produced by the second electromagnetic signal are measured with the receiver. The method also includes developing near surface information from the shallow measurement data and then employing the near surface information to remove the shallow measurement data from the combined shallow and deep measurement data to produce deep measurement data. Finally, the data associated with the deep structures is analyzed to determine if the deep structures include a target of interest or to evaluate, measure, characterize, map or monitor the target of interest.

Additional objects, features and advantages of the present invention will become more readily apparent from the following detailed description of a preferred embodiment when taken in conjunction with the drawings wherein like reference numerals refer to corresponding parts in the several views.

BRIEF DESCRIPTION OF THE DRAWINGS

The present invention is described with respect to particular exemplary embodiments thereof and reference is accordingly made to the drawings in which.

DETAILED DESCRIPTION OF THE PREFERRED EMBODIMENTS

Figure 1:
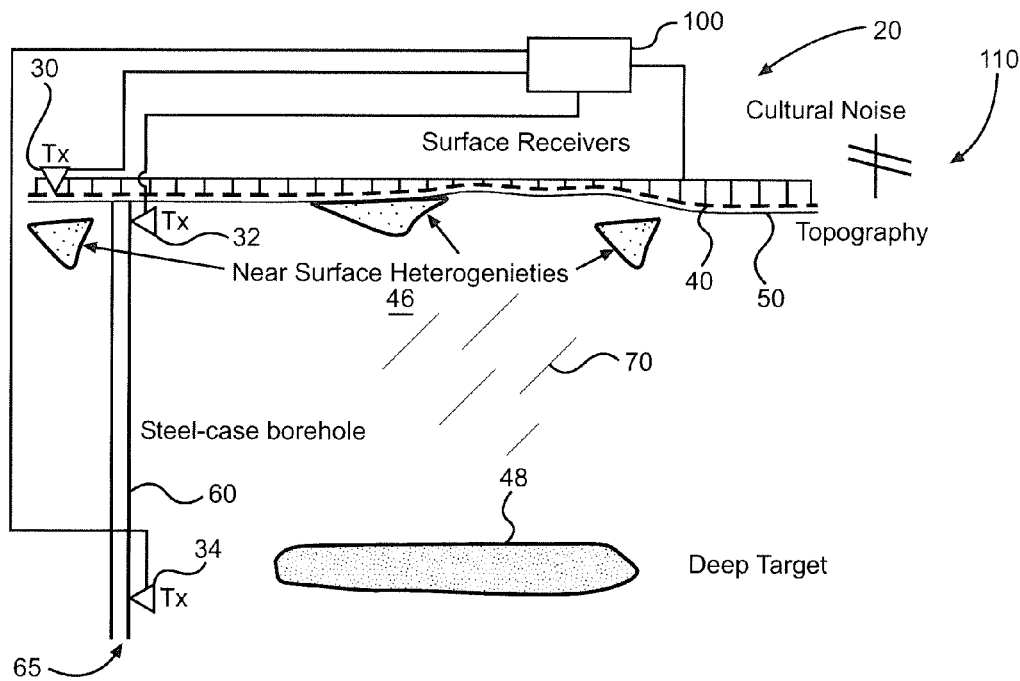
FIG. 1 is a schematic diagram of near surface geological, topographic and cultural noise conditions adjacent to a borehole where a source is deployed to image a deeper target of interest.

Detailed embodiments of the present invention are disclosed herein. However, it is to be understood that the disclosed embodiments are merely exemplary of the invention which may be embodied in various and alternative forms. The figures are not necessarily to scale, and some features may be exaggerated or minimized to show details of particular components. Therefore, specific structural and functional details disclosed herein are not to be interpreted as limiting, but merely as a representative basis for teaching one skilled in the art to variously employ the present invention.

In the description which follows, like parts may be marked throughout the specification and drawing with the same reference numerals. The foregoing description of the figures is provided for a more complete understanding of the drawings. It should be understood, however, that the embodiments are not limited to the precise arrangements and configurations shown. Although the design and use of various embodiments are discussed in detail below, it should be appreciated that the present invention provides many inventive concepts that may be embodied in a wide variety of contexts. The specific aspects and embodiments discussed herein are merely illustrative of ways to make and use the invention and do not limit the scope of the invention. It would be impossible or impractical to include all of the possible embodiments and contexts of the invention in this disclosure. Upon reading this disclosure, many alternative embodiments of the present invention will be apparent to persons of ordinary skill in the art.

As noted above, borehole to surface electromagnetics is emerging as a significant new method for imaging the Earth, especially in oil and gas fields. As will become fully evident below, the invention, as particularly represented in FIGS. 1 and 2, sets forth an electromagnetic data acquisition system 20 which employs multiple transmitters or sources 30, 32 and 34, along with multiple receivers 40. FIG. 1 shows near surface heterogeneities or shallow structures 46 and deep target or structures 48. As shown, transmitter 30 is a surface transmitter located on the Earth's surface 50. However, transmitter 34 is located down a casing 60 of a borehole 65 and constitutes an electromagnetic source, adapted to be operated at a depth in borehole 65, for generating electromagnetic signals which interact with subsurface structures, such as shallow structures 46 or deep structures 48, with these electromagnetic signals affecting electromagnetic fields 70 which are detected by receivers 40. Receivers 40 are adapted to be operated on the Earth's surface 50 to detect electromagnetic fields 70 (represented in FIG. 1) and produce data representative of electromagnetic fields 70. A controller 100 is connected to sources 30, 32 and 34 and receivers 40. Controller 100 is configured to activate sources 30, 32 and 34 so that sources 30, 32 and 34 generate the electromagnetic signals with a first set of components that are affected by shallow structures 46 and a second set of components that are affected by both shallow structures 46 and deep structures 48. Controller 100 also receives the data from receivers 40, and separates the data into data associated with shallow structures 46 and data associated with deep structures 48. Controller 100 is also configured to analyze the data associated with deep structures 48 to determine if deep structures 48 include a target of interest, such as ore bodies, hydrocarbons, water, steam, carbon dioxide, proppants, hydraulic fracture (fracking) fluids and/or proppant, salts, other substances injected into the ground to improve the effectiveness of geophysical soundings, and environmental noise. In general, the the deep measurement data is analyzed to characterize and/or map and/or image the target of interest In further detail, electromagnetic data acquisition system 20 preferably conducts a series of measurements and data treatments that preferentially illuminate near surface geologic, shallow structures 46, so that the shallow measurement data corresponding to shallow structures 46 may be recovered separately from data corresponding to deep structures 48 of interest. Fluids and gases are considered to be part of this geologic structure. With this method, EM (electric or magnetic) source 34 is placed at depth, usually within borehole 60 and, when activated, generates field 70 and currents within the subsurface that interact with subsurface structures 46, 48. The total field 70 is the sum of the provided signal (primary field) and that produced by this interaction (secondary field). This field 70 is measured at the surface with an array of magnetic and/or electrical field detectors such as receivers 40 that acquire shallow and deep measurement data including at least one component of electric field 70 and/or signals for induced polarization. The fields are inverted to yield an electrical resistivity distribution that may be associated with deep structures 48 of interest. In other words, the distribution of electric field 70 measured at surface 50, and included in the shallow and deep measurement data, is inverted to give a one- two-2.5- or three-dimensional model or image of the electrical resistivity of the subsurface which, in turn, can be analyzed to determine and identify the distribution of typical targets, such hydrocarbons and other resources of economic value. The concept of using a model of the Earth and inverting distribution of an electric field measured at the surface is known in the art and will not be discussed further here.

Borehole to surface electromagnetic techniques are much more sensitive to subsurface structures than surface electromagnetic techniques due to the closer proximity of source 34 to the region of interest i.e. deep structures 48. That is, when source 34 is deployed close to target region or deep structures 48, resulting field 70 is much more sensitive to deep structures 48 than a measurement with a more remote source. Unfortunately, although there is more sensitivity to deep structures 48 near the transmitter antennas i.e., source 34, there is also high sensitivity to shallow structures 46 near the receivers 40, or to the near surface geology, topography and infrastructure 110. That is, in areas of complex near surface geology, it may still be difficult to resolve deep targets due to "geologic noise" from near surface structures.

Figure 2:
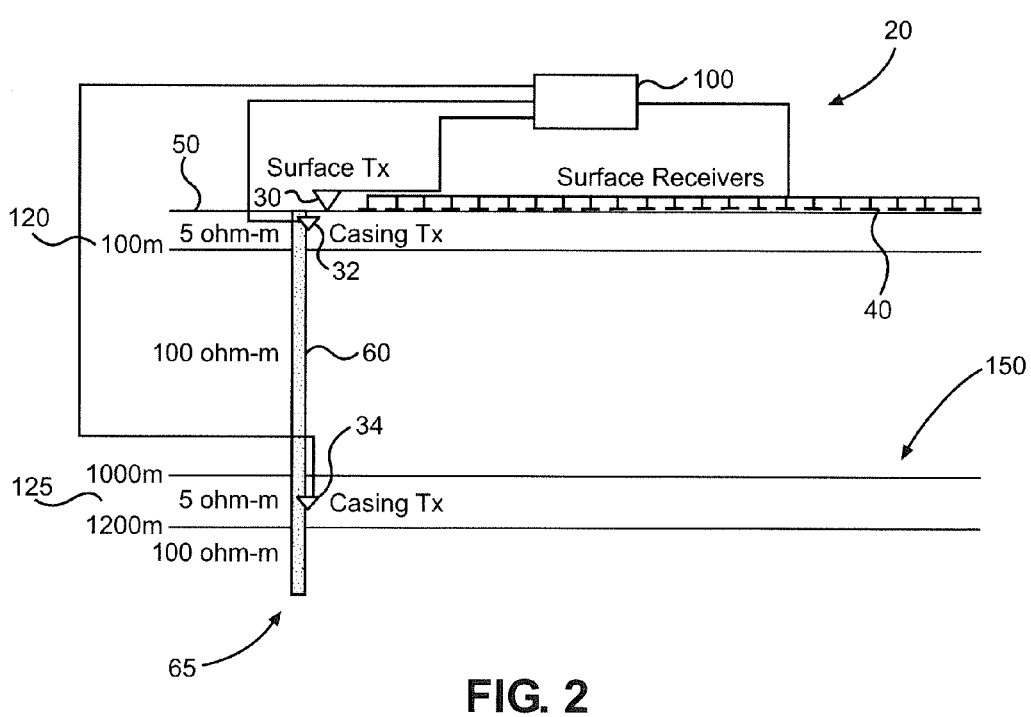
FIG. 2 is a schematic representation of a simple model to illustrate the data treatment.

The Earth's resistivity structure is perhaps most variable in the upper 100 m shown by reference numeral 120 in FIG. 2 and referred to as near surface. Here variations in water saturation and water salinity in the porous, largely sedimentary rock of near surface 120 can provide significant changes over a scale of a few meters. In addition, this area has more man-made infrastructure 110, like pipelines, powerlines and water pumps that can cause changes in the data. These abrupt changes easily manifest themselves in collected data and are often difficult to recognize in the fields themselves.

The problem is particularly acute in areas of high topography and high cultural background noise. Topography produces abrupt changes in the Earth's electrical field due to the field discontinuity at the air/earth interface or Earth's surface 50. In addition, man-made infrastructure 110 produces significant field distortion and man-made noise that may corrupt field readings. Measurements designed to image deeper targets will be influenced by this variation and this influence is hereby accounted for in the data analyzing, processing and imaging.

The philosophy for solving this issue is to separate subsets of collected data that are more sensitive to near surface 120 environment from those sensitive to deep structure 48 and shallow structures 46. Once the shallow structure 46 has been recovered from inversion, it is thereafter not allowed to vary during subsequent inversions to recover deep structures 48 of interest. In this context, "removed" or "cancelled" means "eliminated, frozen or otherwise constrained." In other words, the data more sensitive to shallow structures 46 is used to interpret and set near surface 120 geological structure. This near surface structure is thereafter constrained to prevent it from varying in later interpretation efforts (also referred to as "fixing" or "setting" the near surface information) prior to interpreting data that is also sensitive to deep structures 48. Ideally, this discrimination can be made from existing measurement so that a separate deployment is not required. The methods to accomplish this result fall into at least two categories, i.e., Category 1: Adjusting operational parameters (Methods 1, 2 and 3); and Category 2: Adjusting source and receiver geometries (Methods 4 and 5).

In Method 1 a surface or near surface transmitter or source 30 is operated at higher frequencies (i.e., in the order of 100-500 Hz) that will interact with shallow structures 46 and affect the shallow measurement data. However, due to inductive losses, these signals will not penetrate to deep structures 48 of primary interest. The same source 30 and receivers 40 are then operated at a lower frequency (i.e., in the order to 5 Hz) that will illuminate both shallow structures 46 and deeper structures 48 to affect the shallow and deep measurement data. The higher frequency data is treated separately and used to obtain the geologic structure and man-made infrastructure in the upper 100-500 m. The higher and lower frequency signals may be transmitted simultaneously using a dual frequency waveform. This allows the high frequency and low frequency data to be collected simultaneously. Such combination waveforms are in common use in a variety of scientific and engineering applications. With this method, higher frequency data has a limited penetration depth due to the electromagnetic skin depth so that a source that transmits higher frequency data will provide illumination of the near surface only, whereas the lower frequency transmission illuminates shallow and deeper structures. The higher frequency data is then used to fit the near surface geological structure. The model of this shallow geology is then fixed/set and prevented from varying and the low frequency data is fit by constraining the inversion to only change the model in the deeper horizons, i.e., those associated with the target depths.

These techniques are illustrated using a simple layered model 150 shown in FIG. 2. Here a 100 m thick surface layer 120 of 5 ohm-m represents the near surface geology. A 200 m thick deep layer 125 at a depth of 1000 m represents the "deep" target, or deep structures 48. Electrical dipole transmitter locations 30, 32 and 34 are indicated with the triangle symbol, while surface receivers 40 are designated with horizontal lines.

Figure 3B:
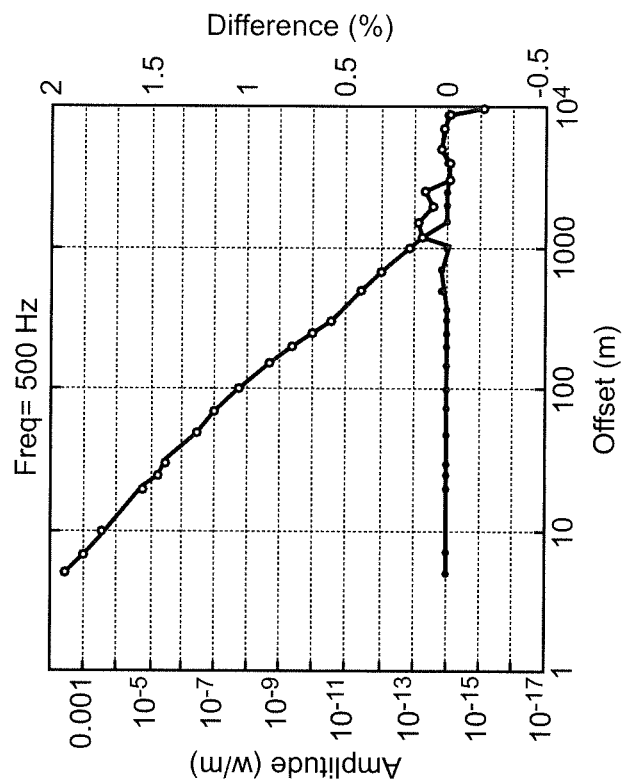
FIG. 3A is a graph showing sensitivity to a deeper layer at low frequency.
FIG. 3 B is a graph showing no sensitivity to the same deeper layer of FIG. 3 at high frequency.
Figure 3A:
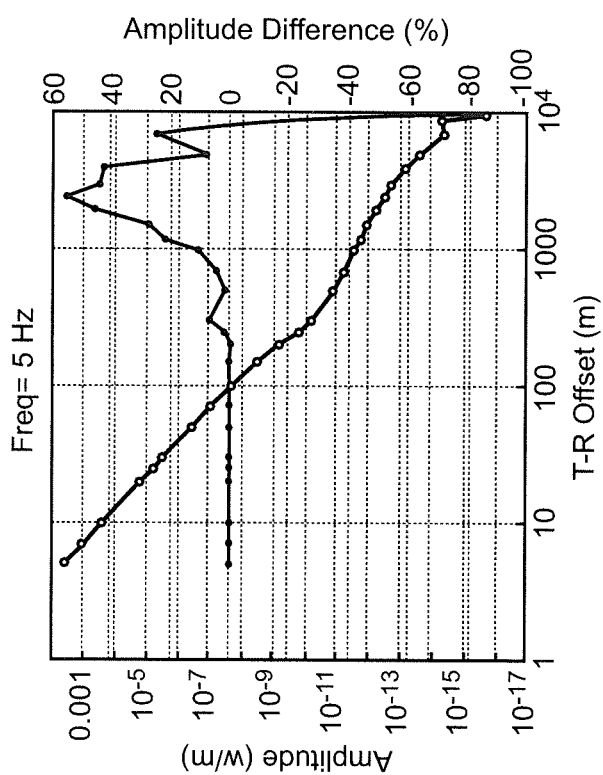

In FIGS. 3A and 3B the calculated data from a surface transmitter or source 30 over model 150 is shown using frequencies of 5 Hz in FIG. 3A and 500 Hz in FIG. 3B. The plots show the response from a surface transmitter 30, wherein the line with hollow points represents the amplitude of the measured signal and line with solid points represents the percent difference in amplitude between a model with and without that deeper layer, for both sources. At low frequencies, FIG. 3A, the percent difference is more noticeable (up to +−60%), while at higher frequencies, FIG. 3B the percent difference is negligible, indicating that the data are insensitive to the presence of the layer at depth.

The data plot shows a significant response of the deeper layer 125 at the low frequency at offsets greater than 800 m; the high frequency profiles show almost no response from deeper layer 125. Using the higher frequency data shown in FIG. 3B to resolve shallow structures 46, or provide an equivalent model, enables use of the low frequency data in FIG. 3A to resolve deeper structures 48 of interest.

Method 2 is a variant on method 1, but in this case a lower amplitude transmitter signal is used that will interact with shallow structures 46. However, it is weak signal that is too weak to penetrate deeply and thus deep structures 48 will provide no response. This technique uses the principle that a signal that penetrates to great depth and interacts with deep structures 48 must be quite powerful. A weaker signal will attenuate to below a detection threshold before it can penetrate to target depths 125 and will illuminate near surface 120 only. A more powerful signal will then illuminate both shallow structures 46 and deeper structures 48 and this will be analyzed with near surface 120 fixed or cancelled. Using the same analogy, near surface 120 is illuminated with a weak source, followed by a strong source, or vise-versa.

Figure 4:
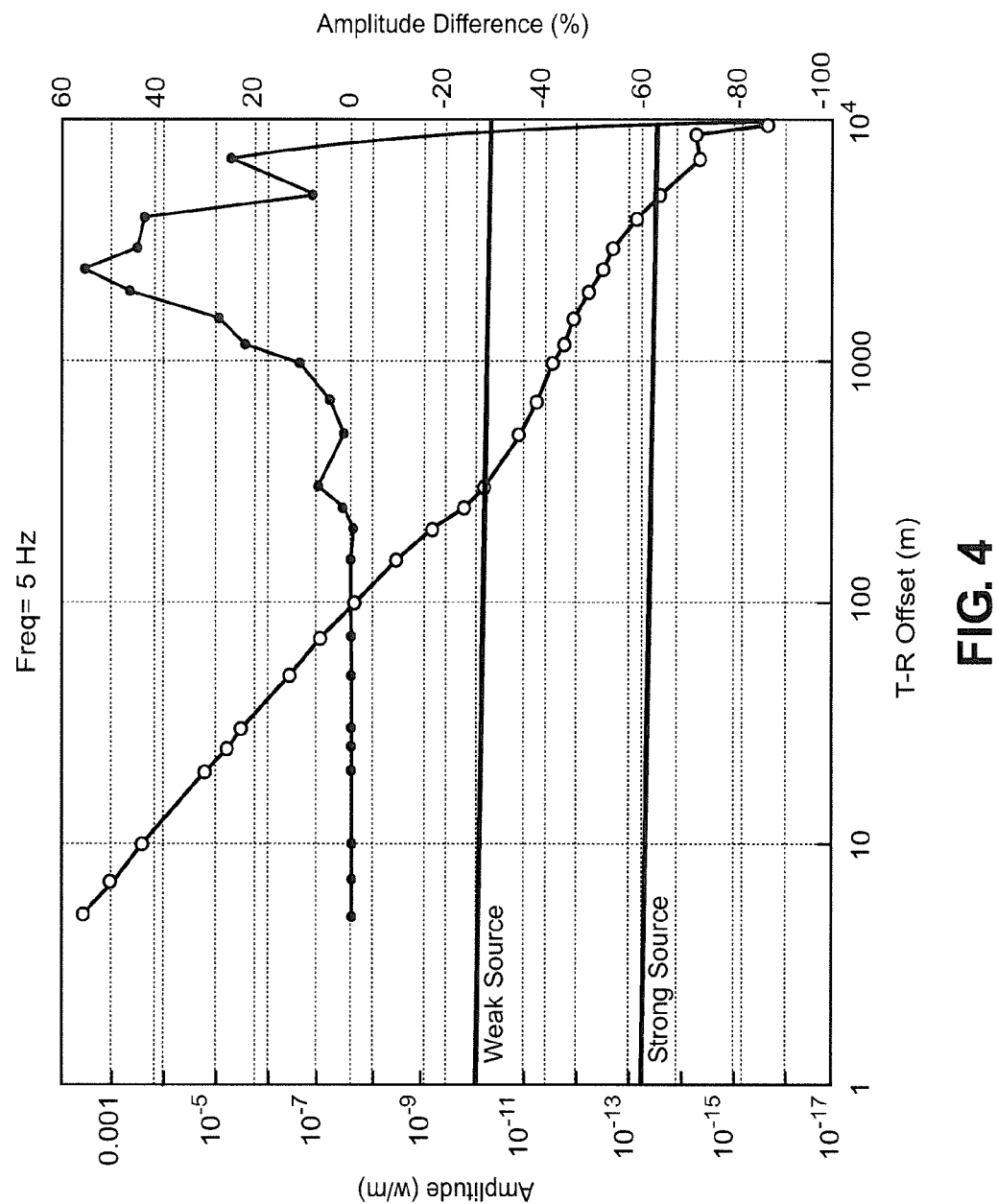
FIG. 4 is a graph showing the noise levels for the two sources, where only the signal levels above the source lines are recoverable.

The graph in FIG. 4 shows the noise levels for the two sources, where only the signal levels above the lines are recoverable. The graph indicates that the weak source recovers only the signal sensitive to shallow structures 46, whereas the deeper source recovers signals from both sets of structures 46 and 48. More specifically, FIG. 4 duplicates the plot of FIG. 3A, but adds in two lines representing a weak and a strong source noise level. These lines apply only to the hollow point curve representing measured amplitude. Only signals with amplitudes above these lines are observed. The solid point curve "amplitude % difference" plot (with its values on the right-hand-side axis), in the case where the amplitude of the measured signal is above the weak source only, the percent difference is close to 0. In the part of the percent difference plot, which correlates to where the amplitude is below the weak source threshold but above the strong source threshold, significant changes in the solid point line are seen. Therefore, if we use a weak source only, we ensure that our data is measuring/sensitive to the near-surface resistivity only. Only when the strong source is used can we measure the small amplitude fields that are sensitive to the target at depth, and observe their differences from a background model.

The large amplitude percent differences (high solid point line values) representing sensitivity to the presence of the deep target are derived from measurements taken at long-offset. These long-offset values; however, are very small and below the weak source threshold, and thus could not be measured. The strong source is needed to have sensitivity to structure at depth, because otherwise the signals are too small to be measured. In contrast, by using only the weak source, one is able to ensure that any percent differences measured will be due purely to the near surface features.

Method 3 involves use of the lower frequencies to obtain a deeper portion of upper geological shallow structures 46 and man-made infrastructure 110. In this method, only data collected within approximately 1 km of the source location 30 are analyzed to obtain a near surface geological model. This data will be largely insensitive to deeper structures 48 due to the limited amount of geometric source-receiver spreading. Again, this data will be treated differently from other data and data for shallow structures 46 determined for this data alone and subsequently fixed. Using the same layered model analogy of FIG. 2, this can be shown with already plotted data. Using the data from FIG. 3, again poor sensitivity to deeper layer 125 is noted at offsets of less than 800 m. Therefore, preferentially the data collected within 1 km of the source is used in mapping shallow layer 120.

In Method 4, a borehole conductor or source 34 is used as a transmitter antenna. As described in U.S. Patent Application Publication No. 2015/0219784, incorporated herein by reference, a borehole conductor can comprise any conductive material or combination of conductive materials associated with a borehole, including, but not limited to, casing, tubing, rods, and/or fluids, or could consist of a conductor added to the borehole (either temporarily or permanently) such as an electrode commonly used in bore to surface methods. The current source is electrically connected to a borehole conductor (i.e., well casing 60) at one or more positions 32, 34. At the top position, the well casing 60 will principally illuminate the near surface, shallow structures 46. At greater (i.e., reservoir) depths, source 34 will mainly illuminate deep structures 48 associated with the principal targets. With this method, the electromagnetic sources may be deployed on a borehole conductor (i.e., steel well casing) or in an open hole and tubing may be present. In any case, two configurations are considered, one where source 32 is deployed at or near surface 50, and the second where source 34 is deployed at depth as shown in FIG. 1. Other deployments between or beyond 32 and/or 34 may also be utilized. Data from shallow source 32 is then interpreted to provide a model for the near surface geology and this is fixed prior to the inversion and/or interpretation of the data from deeper source 34.

In Method 5, only data collected within approximately 1 km of the source 30 is analyzed to obtain a near surface geological and infrastructure model. This data, which is collected from a series of surface grounded antennas or a "top casing" source 32 defined as an electrical source grounded into the top of a borehole conductor (i.e., a conductive well casing), will be largely insensitive to deeper structures 48 due to the limited amount of geometric source-receiver spreading. The workflow for Method 5 is that only "local" source and receiver combinations are used to interpret the near surface geology. That is, surface source 30 and top casings 32 are used in combination with surface receivers 40 that are located within approximately 1 km from these sources to interpret near surface geologic structures and infrastructure (i.e., the upper 100-500 m). This close source-sensor spacing has a much reduced sensitivity to structures beneath 500 m and can therefore be used to interpret shallow structures 46 and infrastructure 110, with the near surface resistivity distribution being canceled prior to or while analyzing, processing and/or inverting the data.

Although described with reference to preferred embodiments of the invention, it should be readily understood that various changes and/or modifications can be made to the invention without departing from the spirit thereof. For instance, although the invention has been described as being applicable to borehole to surface electromagnetic techniques wherein electromagnetic sources are located in a borehole and one or more electromagnetic sources are deployed at the surface, the invention could also be used with other novel forms of electromagnetic techniques. In general, the invention is only intended to be limited by the scope of the following claims.

We claim:

1. A method for removing near surface or shallow effects from borehole to surface electromagnetic data and/or surface to borehole electromagnetic data collected by an electromagnetic data acquisition system, including an electromagnetic source, an electromagnetic receiver and a controller, for measuring subsurface structures or fluids, said method comprising:
    deploying the system in an area of interest by placing one or more electromagnetic sources at a depth in a borehole and placing one or more electromagnetic receivers at or near the Earth's surface;
    activating the electromagnetic source to generate a first electromagnetic signal that primarily illuminates shallow structures and/or fluids and a second electromagnetic signal that is more powerful and has a larger amplitude than the first electromagnetic signal and illuminates both shallow and deep structures and/or fluids;
    measuring, with the electromagnetic receiver, shallow measurement data produced by the first electromagnetic signal and shallow and deep measurement data produced by the second electromagnetic signal;
    removing the shallow measurement data from the shallow and deep measurement data to establish deep measurement data; and
    analyzing, with the controller, the deep measurement data to characterize and/or map and/or monitor the deep structures and/or fluids.

2. The method according to claim 1, wherein removing the shallow measurement data from the shallow and deep measurement data to produce the deep measurement data includes inverting the shallow and deep measurement data to produce an image of the deep structures while removing the shallow measurement data during the inverting of the shallow and deep measurement data.

3. The method according to claim 1, further comprising:
    producing low frequency signals with the electromagnetic source that affect the shallow and deep measurement data; and
    producing high frequency signals that affect the shallow measurement data.

4. The method according to claim 1, further comprising:
    placing part of the electromagnetic receiver within a set distance of the borehole to collect the shallow measurement data; and
    placing part of the electromagnetic receiver at distances greater than the set distance from the borehole to collect the shallow and deep measurement data.

5. The method according to claim 1, further comprising:
    placing part of the electromagnetic source at a shallow depth to produce signals that generate the shallow measurement data; and
    placing part of the electromagnetic source at a deep depth to produce signals that generate the shallow and deep measurement data.

6. The method according to claim 1, further comprising analyzing the deep measurement data to determine if the deep structures include a target of interest.

7. A method for removing near surface or shallow effects from borehole to surface electromagnetic data and/or surface to borehole electromagnetic data collected by an electromagnetic data acquisition system, including an electromagnetic source, an electromagnetic receiver and a controller, for measuring subsurface structures or fluids, said method comprising:
    deploying the system in an area of interest;
    activating the electromagnetic source to generate low frequency signals that affect the shallow, deep measurement data and high frequency signals that affect the shallow measurement data and combine the low and high frequency signals into a dual waveform;
    measuring, with the electromagnetic receiver, shallow measurement data produced by the high frequency signals and shallow and deep measurement data produced by the low frequency signals;
    removing the shallow measurement data from the shallow and deep measurement data to establish deep measurement data; and
    analyzing, with the controller, the deep measurement data to characterize and/or map and/or monitor the deep structures and/or fluids.

8. An electromagnetic data acquisition system for measuring subsurface structures with electromagnetic fields and for removing near surface effects from borehole to surface electromagnetic data and/or surface to borehole electromagnetic data, said system comprising:
    an electromagnetic source adapted to be operated at a depth in a borehole formed in the Earth's surface and for generating electromagnetic signals which interact with the subsurface structures and affect the electromagnetic fields;
    an electromagnetic receiver adapted to detect the electromagnetic fields and produce data representative of the electromagnetic fields; and
    a controller connected to the source and receiver and configured to: activate the source to generate a first electromagnetic signal that primarily illuminates shallow structures and a second electromagnetic signal that is more powerful and has a greater amplitude than the first electromagnetic signal and illuminates both shallow and deep structures; measure, with the receiver, shallow measurement data produced by the first electromagnetic signal and shallow and deep measurement data produced by the second electromagnetic signal; remove the shallow measurement data from the shallow and deep measurement data to produce deep measurement data; and analyze the deep measurement data characterize and/or map and/or monitor the deep structures and/or fluids.

9. The system according to claim 8, wherein the controller is configured to remove the shallow measurement data from the shallow and deep measurement data to produce deep measurement data by inverting the shallow and deep measurement data to produce an image or understanding of the deep structures while keeping the shallow measurement data fixed during the inverting of the shallow and deep measurement data.

10. The system according to claim 8, wherein the electromagnetic source is an electric dipole source.

11. The system according to claim 10, wherein, in use, the dipole source produces low frequency signals with the electromagnetic source that affect the shallow and deep measurement data and produces high frequency signals that affect the shallow measurement data.

12. The system according to claim 8, wherein the receiver is adapted to collect the shallow measurement data from within a set distance of the borehole and is adapted to collect the shallow and deep measurement data from distances greater than the set distance from the borehole.

13. The system according to claim 8, wherein the electromagnetic source includes a transmitter at the surface or at a shallow depth which produces signals that generate the shallow measurement data and includes a transmitter at a deep depth which produces signals that generate the shallow and deep measurement data.

14. The system according to claim 8, wherein the electromagnetic source includes a transmitter constituted by a borehole conductor.

15. The system according to claim 8, wherein the borehole is in an oil and/or gas field, and the controller is further configured to determine if the deep structures include a target of interest.

16. The system according to claim 15, wherein the target of interest is or includes hydrocarbons, and the shallow structures include at least one of pipelines, power lines, water, cavern, and water pumps.

* * * * *